Dec. 28, 1965  G. CARAMANNA  3,225,856
SAFETY HINGE AND LATCH FOR A VEHICLE BODY CLOSURE
Filed Oct. 1, 1963  3 Sheets-Sheet 1

INVENTOR.
George Caramanna
BY
Edward E. James
ATTORNEY

Dec. 28, 1965   G. CARAMANNA   3,225,856
SAFETY HINGE AND LATCH FOR A VEHICLE BODY CLOSURE
Filed Oct. 1, 1963   3 Sheets-Sheet 2
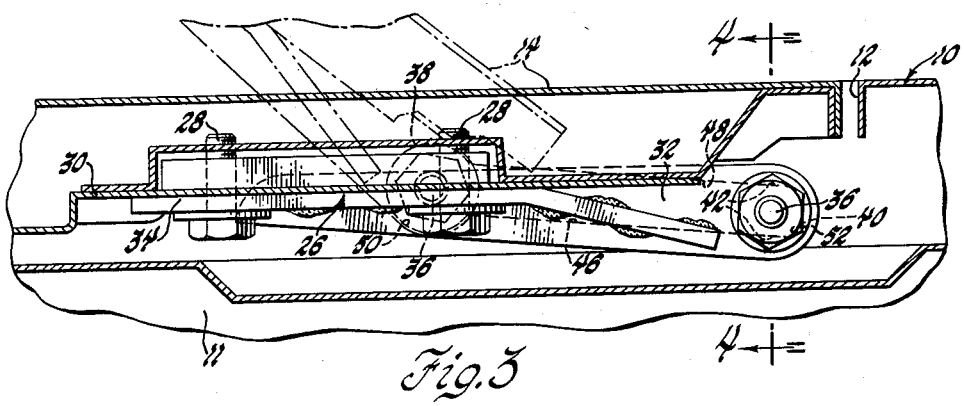
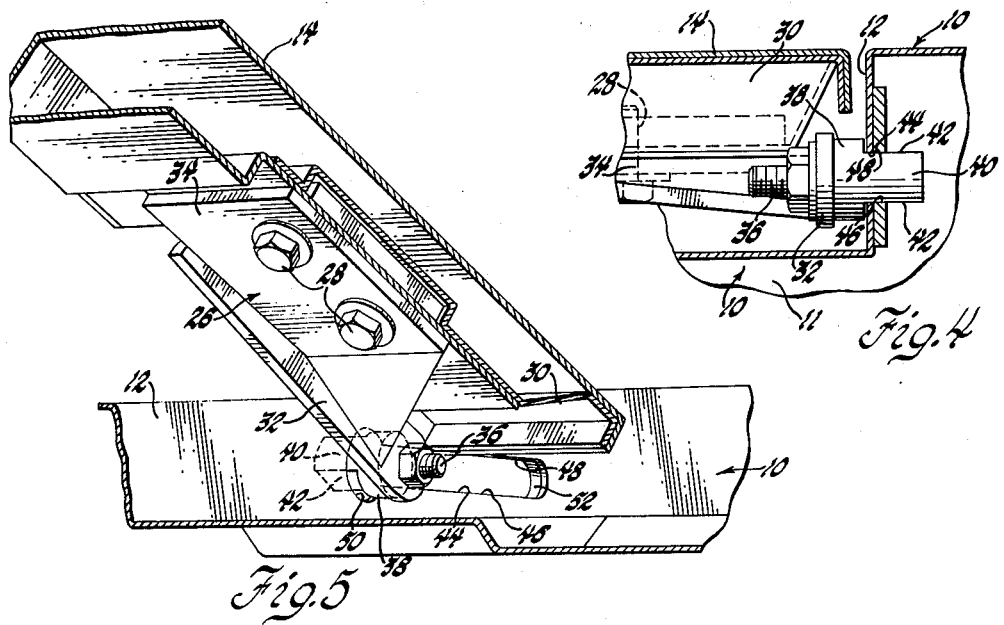
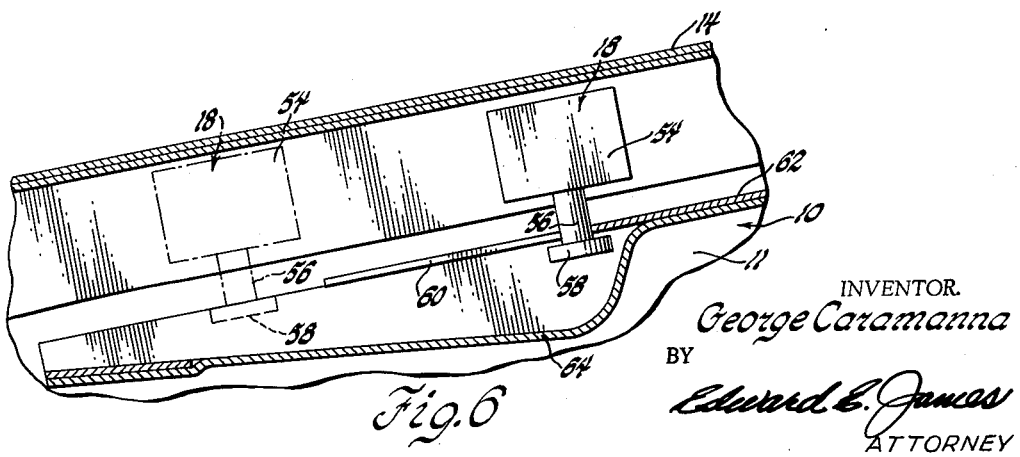
INVENTOR.
George Caramanna
BY
Edward E. James
ATTORNEY

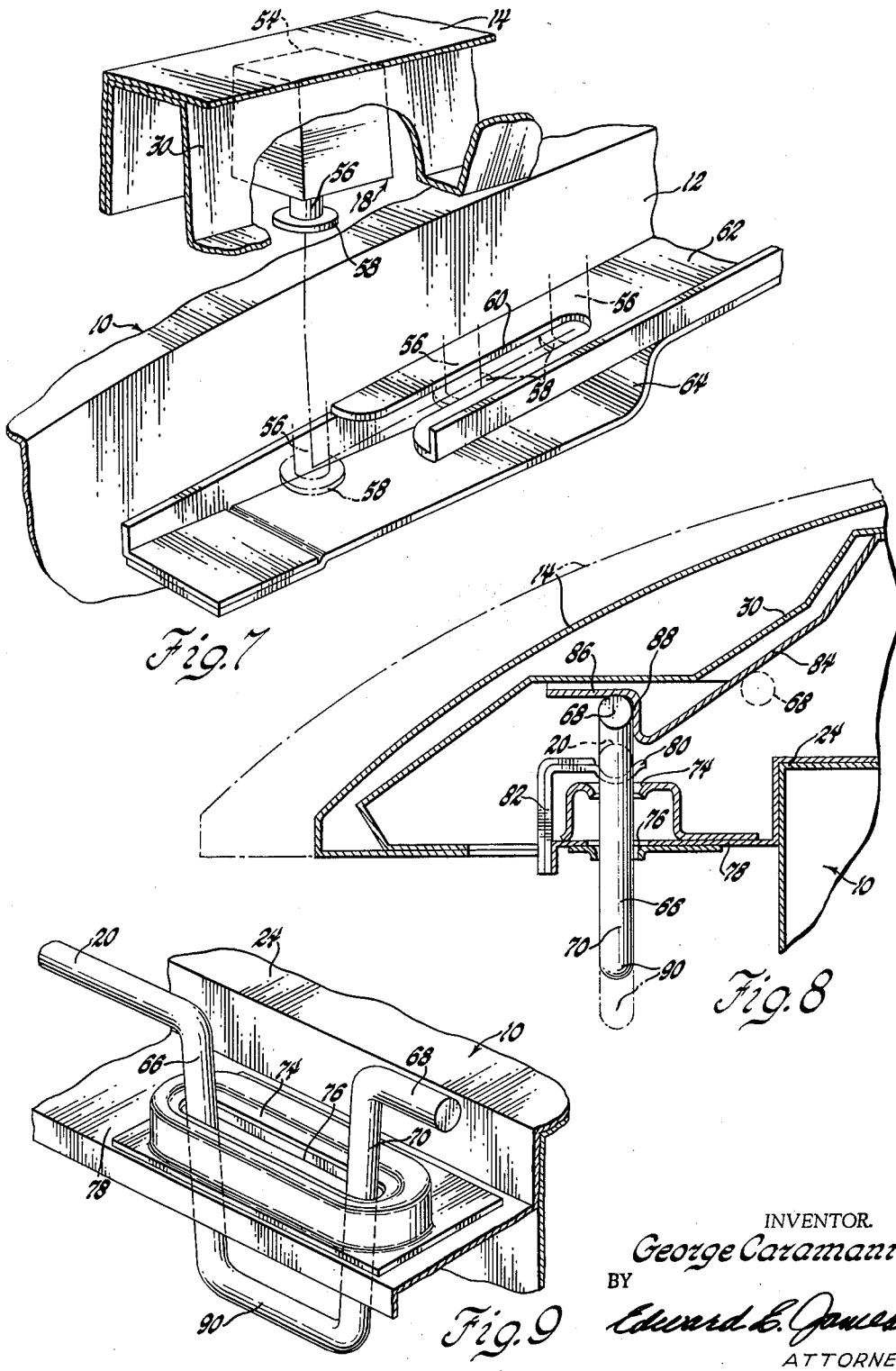

United States Patent Office 3,225,856
Patented Dec. 28, 1965

3,225,856
SAFETY HINGE AND LATCH FOR A VEHICLE BODY CLOSURE
George Caramanna, Detroit, Mich., assignor to General Motors Corporation, Detroit, Mich., a corporation of Delaware
Filed Oct. 1, 1963, Ser. No. 312,995
19 Claims. (Cl. 180—69)

This invention relates generally to a hinged closure member and more particularly to a hinge and latch arrangement for the hood or closure member of a vehicle body defined engine or luggage compartment.

The compartment closing members of modern vehicles have been generally mounted on the vehicle body for swinging translation by gooseneck hinges or by quadrilateral hinge linkages. To facilitate closure opening and compartment access within hinge or closure checking limits, such hinges are usually provided with overcenter counterbalancing springs. Such spring biased hinges usually require a hood or closure member of somewhat greater strength and weight. Often the accumulative manufacturing tolerances of such hinges make it difficult to install and maintain the hood or closure member in proper alignment with the vehicle body opening. To insure maintenance of a front opening hood or closure member in its closed position during vehicle operation, such conventional hinges further require the use of relatively complex, heavy-duty latch mechanisms having both primary and secondary safety latching means.

The instant invention contemplates an improved closure mounting arrangement wherein hinge and latch means of relatively simple inexpensive design cooperate to interlock and maintain a relatively light hood or closure member in a fully closed safety position with respect to the vehicle body.

The invention further contemplates and provides an illustrative front opening hood or closure member with hinge means of simple construction which may be easily installed and adjusted for proper closure-to-body alignment, which facilitate engine compartment access for service and maintenance, and which permit interlocking movement of the closure member to a fully closed safety position maintainable by the vehicle speed induced air flow to prevent upward swinging movement of the closure member.

With regard to certain of its more specific aspects, the illustrative embodiment of the invention provides the hood and body members with cooperating means of relatively simple economical construction and slidably interengageable to restrain the front of the hood or closure member against air flow induced swinging movement when shifted toward its hinge interlocking fully closed safety position. Upon movement of the hood member from its hinge interlocking position to a nominally closed hinge journaling position, the hood or closure member may be swung upwardly to an opened position. In the illustrative embodiment, the hood member is maintainable alternatively by a pivotally mounted swingable prop rod or support member in either a raised rod supported opened position or in its fully closed position with the rod in a stored position latchably interengaging the body and hood member.

The foregoing and other objects, advantages and features of the invention will be apparent from the following description of the illustrative embodiment having reference to the accompanying drawings, in which.

Figure 1:
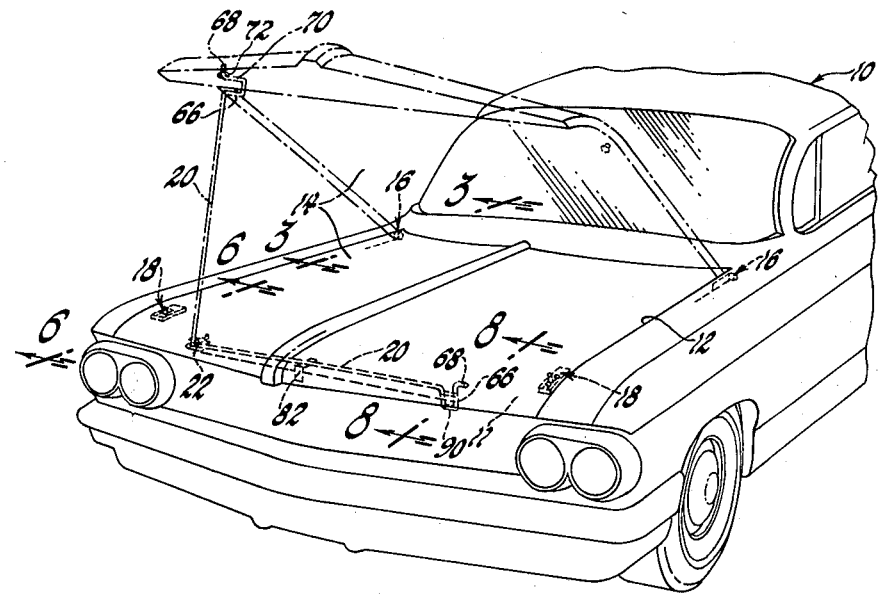
FIGURE 1 is a partial three-quarter front perspective view of an automotive vehicle body having a front engine compartment and a front hood member mounted in accordance with the invention for movement between an extreme fully closed position shown in full lines and a prop rod supported opened position shown in broken lines.
Figure 2:
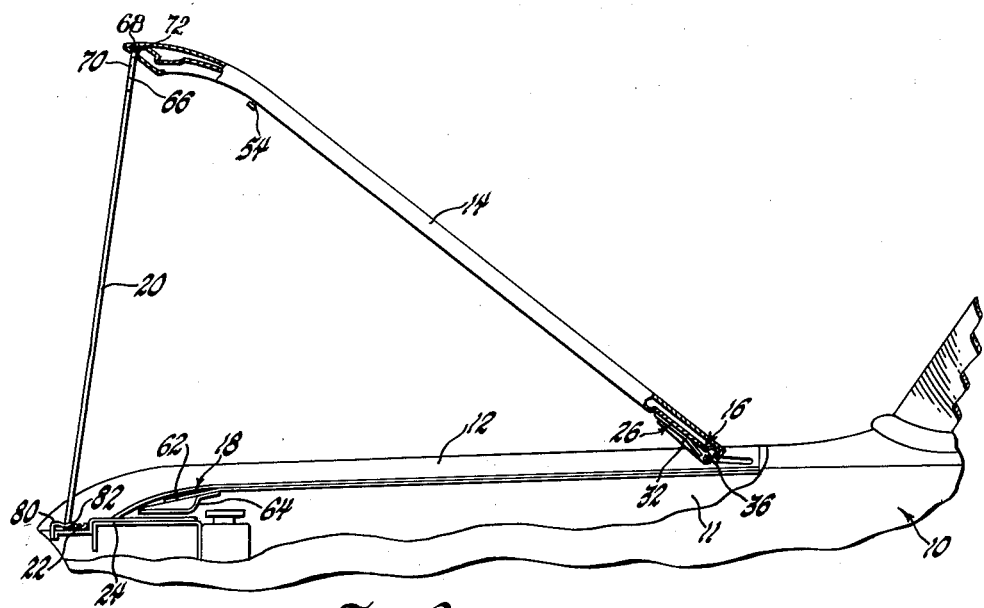
FIGURE 2 is an enlarged fragmentary side elevational view of the upper front portion of the illustrative vehicle body and of the hood in its prop-maintained opened position with portions of the body and hood members broken away to show the cooperating hood hinge and latch means of the invention.

FIGURE 3 is a further enlarged fragmentary view similar to the broken away hinge portion of FIGURE 2 and is sectioned longitudinally substantially in the plane of the line indicated at 3—3 of FIGURE 1 to show the interlocked fully closed positions of the combined hinge and hood interlocking members in full lines with the prop supported opened positions of the hood and hinge members being shown in broken lines;

FIGURE 4 is a transverse fragmentary sectional view taken substantially in the plane indicated at 4—4 of FIGURE 3 and shows the illustrative hood hinge members in their cooperating hood interlocking fully closed positions;

FIGURE 5 is a perspective view showing the cooperating hood and hinge members of the illustrative embodiment in their prop-maintained opened positions;

FIGURE 6 is a fragmentary sectional view taken substantially in the plane and direction of the arrows indicated at 6—6 of FIGURE 1 and showing the front portions of the fully closed hood and body members and the cooperating slidably interengaged elements of the front hood securing means in full lines and by broken lines indicating hood releasing disengagement therebetween;

FIGURE 7 is a fragmentary perspective view showing the slidably interengageable elements of the front hood securing means in spaced relation prior to movement of the hood member to its initial nominally closed position and rearwardly as indicated in broken phantom lines to its hinge interlocking safety position;

FIGURE 8 is a fragmentary sectional view taken substantially in the direction of the arrows indicated at 8—8 of FIGURE 1 and shows the hood supporting prop rod in a folded or stored position latchably interengaging the hood and body members to secure the hood member in its fully closed safety position; and FIGURE 9 is a fragmentary perspective view further illustrating the swingable hood supporting and latching end of the prop rod in its stored position in relation to a receiving slot formed in a transverse body member.

Referring more particularly to FIGURE 1, the front portion of the illustrative automotive vehicle body 10 has a front engine compartment 11 accessible for service and maintenance through an upwardly disposed opening 12 formed by the adjacent exterior panels of the vehicle body. A hood or closure member 14 of relatively light construction is mounted on the vehicle body in accordance with the invention by a pair of slidably interlocked hinges 16 spaced transversely of the vehicle and extending between the rear undercorners of the hood and the adjacent rear corner side walls defining the body opening. The cooperating elements of these hinges permit swinging movement of the hood between an extreme windshield or roof engaging opened position providing unrestricted access to the engine compartment and a nominally closed forward position.

The hood is shiftable rearwardly from its forward nominally closed position in guided compartment closing engagement with the body member to an extreme fully closed safety position shown in full lines in FIGURES 1 and 3. This fully closed position of the hood is normally maintained by the rearward movement conditioned interlocking action of the hinges 16, by cooperating interlocking means 18 transversely spaced and slidably interengaged between the front of the hood and the adjacent portions of the body, and by a support or prop rod member 20 stored transversely of the vehicle and latchably interengaging a transverse front body member 24 and the adjacent forward underportion of the hood.

The stored, hood latching position of the prop rod 20 is shown in dashed hidden lines in FIGURE 1 with the latching portions thereof being shown in full lines in the enlarged fragmentary detailed views of FIGURES 8 and 9. The rod 20 is pivotally mounted at 22 on the transverse body member 24 and is swingable from its stored position to a raised hood supporting position shown in broken and full lines in FIGURES 1 and 2, respectively.

Only the details of the right hand hinge 16 are illustrated in the several drawing figures. However, the following description is equally applicable to both hinges. As shown in FIGURES 2-5, each hinge 16 comprises a bracket 26 secured at 28 to the opposite rear undercorners of the hood reinforcing frame 30. These brackets are of similar construction but are necessarily of opposite hand. The bracket securing means preferably provides for limited adjustment laterally and longitudinally of the hood. Each bracket 26 has a pivot supporting arm 32 extending rearwardly and slightly downwardly from a hood secured plate 34 in closely spaced parallel relation to the adjacent rear corner side walls defining the compartment opening. A pivot journal forming stud or bolt member 36 is nonrotatably secured to and projects laterally outwardly from the rear end of each bracket arm. The outwardly projecting heads 38 of these pivot bolts are cylindrically formed and notched to provide diametrically opposite journal surfaces 40 intersected by spaced parallel bearing surfaces 42.

In mounting the hood on the vehicle body, the outwardly projecting heads of the pivot bolts 36 are inserted through opposing key-hole shaped bearing slots 44 formed in the compartment side walls adjacent the rear corners of the opening 12. The slots 44 are generally disposed and extend longitudinally of the vehicle. The rear portions of these slots form parallel slide bearing surfaces 46 and 48 extending rearwardly and slightly downwardly from forward cylindrical bearing forming slot portions 50. These forward bearing portions are adapted to pivotally journal the diametrically opposite cylindrical surfaces 40 of the adjacent pivotal bolts heads for swinging movement of the hood to and from its forward nominally closed, body engaging position. When the hood is swung to an opened position, the effected rotation of the pivot studs prevents rearward movement of the hood until it is again returned to its nominally closed forward position. The slidable bearing surfaces of the pivotal bolt heads are then aligned with the adjacent parallel bearing surfaces 46 and 48 formed by the rear portions of each body formed bearing slot. Such bearing alignment permits slidable rearward movement of the hood member from its forward hinge journaling closed position to its extreme fully closed safety position shown in FIGURES 1 and 3 wherein the rear cylindrical journal surfaces of the pivotal bolt heads abut the rear ends 52 of the key-hole slots. Such slidable bearing engagement interlocks the hinges 16 to prevent pivotal hood swinging movement.

During rearward movement of the hood from its forward nominally closed hinge journaling position to its fully closed hinge interlocking safety position, the cooperating elements of the front hood interlocking means 18 are slidably interengaged to prevent any upward swinging movement or deflection of the front of the lightweight hood induced by vehicle air flow conditions. While the following description is applicable to both of the forward laterally spaced interlocking means, only the right hand front interlock is shown in FIGURES 2, 6 and 7. The forward interlocks 18 each include a headed member 54 having a shank portion 56 suitably secured to and depending from the forward opposite side portions of the hood underframe 30 and having an enlarged head 58 spaced slightly therefrom. The depending shank and head portions of these hood mounted members are slidably received and retained within forward opening interlocking slots 60 formed in cooperating interlocking plates 62. These plates are mounted in parallel spaced relation to the body guided rearward movement of the hood member between its nominally and fully closed positions by support members 64 suitably secured to the compartment defining side walls adjacent the front of the vehicle.

As best seen in FIGURES 1, 2, 8 and 9, the prop rod 20 is bent to form a U-shaped lateral arm 66 immediately adjacent a hood engageable end portion 68 distal from its pivotally mounted end 22. The rod end portion 68 is axially offset slightly from the main portion of the rod by the adjacent leg 70 of the bent arm portion 66. When the hood is raised slightly beyond the opened position shown in FIGURES 1 and 2, this offset end portion is insertable in an opening 72 provided in the front underportion of the hood. The hood may then be lowered to engage the rod end 68 and the adjacent leg 70 of the U-shaped arm. To close the hood, the rod end 68 is disengaged by slightly lifting the hood. The rod may then be folded downwardly to its retracted or stored position transversely of the vehicle as shown in FIGURE 1. In this stored position, the lateral arm of the prop rod is insertable as best seen in FIGURES 8 and 9 through vertically aligned slots 74 and 76 provided in the spaced parallel flanges of a receiving bracket 78 formed on or supported by the transverse body member 24. The stored rod 20 is supported intermediate its ends in a cradle 80 formed by an upstanding angled bracket 82 mounted on the transverse body member.

After the rod 20 has been returned to its stored position, the opened hood may be lowered to its nominally closed forward position indicated in broken lines in FIGURE 8. The laterally extending upper end portion 68 of the stored rod does not engage the forward underportion of the hood in this nominally closed position. Upon movement of the hood rearwardly toward its fully closed position, however, the rod end 68 is engaged and deflected downwardly with respect to the rod supporting cradle by a forwardly and downwardly inclined cam 84 formed on a striker plate or member 86 secured to the adjacent underframe 30 of the hood. With proper hood mounting adjustment of the hinge brackets 26, such striker camming rod deflection continues until the rod end clears a vertical striker flange or shoulder 88 on the member 86 just as the hood reaches its fully closed hinge interlocking position. The deflective loading of the cradle supported free end of the rod thereupon biases the rod end portion 68 upwardly, as guided by the arm embracing slots 74 and 76, into resilient latching engagement with the striker shoulder 88. The stored rod thus serves as a resilient latch member operable to maintain the hood in its fully closed interlocked position.

The bight portion 90 of the U-shaped arm 66 of the stored hood supporting rod 20 extends below the slotted flanges of the arm guiding bracket 78 on the transverse body member 24. This depending bight portion is accessible from the front of the vehicle for manual downward deflection of the hood latching rod end about the supporting cradle 80. Such rod deflection disengages the rod end portion from the vertical shoulder on the striker plate 86 and thus premits movement of the hood forwardly from its fully closed hinge interlocking position to its nominally closed hinge journaling position, such linear hood movement simultaneously disengaging the front hood interlocking means.

From the foregoing description of a single illustrative embodiment, it will be seen that the invention provides an improved hinging and latching arrangement for mounting a lightweight closure member on a vehicle body comprising relatively simple, inexpensive, easily fabricated and assembled components and capable of fulfilling the several stated objects and advantages. It will be further apparent to those skilled in the art that various modifications and changes might be made in and from the disclosed embodiment without departing from the spirit and scope of the invention as defined in the following claims.

I claim:

1. In combination with a vehicle body member having a compartment opening,
   a closure member engageable with the body member to close said compartment opening,
   means hinging said closure member on said body for swinging movement between opened and closed positions and for limited linear movement in compartment closing engagement with the body member between said closed position and a safety position conditioning said hinging means to prevent swinging movement of the closed closure member,
   a support rod pivotally mounted on one of said members and swingable between a stored position and a raised position engageable between said members to maintain the closure member in its opened position,
   and said body and closure members each having closely spaced opposing shoulders formed thereon remotely of said hinging means and normally interengaged by said rod in its stored position to latch said closure member against linear movement from its safety position.

2. In the combination set forth in claim 1,
   said rod being accessible in its closure latching stored position from the exterior of the vehicle body for manual deflection disengaging said rod from at least one of said opposing shoulders to permit linear movement and actuation of said closure member to its closed position conditioning the hinging means for opening swinging movement of the closure member.

3. In combination with a vehicle body member having a compartment opening,
   a closure member engageable with the body member to close said compartment opening,
   means hinging said closure member on said body for swinging movement between opened and closed positions and for limited linear movement in compartment closing engagement with the body member between said closed position and a safety position conditioning said hinging means to prevent swinging movement of the closed closure member,
   cooperating means mounted on said body and closure members remotely of said hinging means and slidably engageable upon movement of the closure member from its closed position toward its safety position to secure the closure member against swinging movement,
   a support rod pivotally mounted on one of said body and closure members for swinging movement between a folded stored position and a raised position wherein the swinging end of the rod is engageable to maintain the closure member in its opened position,
   and said body and closure members each having opposing shoulders formed thereon and normally interengaged by said rod in its folded stored position to latch said closure member against linear movement from its safety position.

4. In the combination set forth in claim 3,
   means for deflecting said rod in its folded stored position to resiliently effect closure latching interengagement of the rod between said opposing shoulders upon linear movement of the closure member to its safety position,
   and said rod being accessible in its stored position from outside the vehicle for manual shoulder disengaging deflection to permit linear movement and actuation of said closure member to its closed position thereby slidably disengaging said cooperating means and conditioning the hinging means for swinging movement of the closure member.

5. In combination with a vehicle body member having a compartment opening,
   a closure member engageable with the body member to close the compartment opening,
   means for mounting said closure member on the body member for swinging movement between opened and closed positions and for limited linear movement in compartment closing engagement with the body member between said closed position and a safety position interlocking said mounting means to prevent swinging movement of the closed closure member,
   cooperating means mounted on said members and slidably engageable therebetween to secure the closure member against swinging movement remotely of the mounting means upon linear movement of the closure member to its safety position,
   a rod mounted on one of said members and movable between a stored position and a raised position engageable between said members to support the closure member in its opened position,
   and said members each having adjacent opposing shoulders interengageable by said rod in its stored position to secure the closure member against linear movement from its safety position,
   said rod having at least a portion thereof accessible in its stored position for manual deflection disengaging at least one of said shoulders to permit linear movement and actuation of the closure member to its closed position thereby slidably disengaging said cooperating means and conditioning the mounting means for swinging movement of the closure member.

6. In combination with a body member having a compartment opening,
   a closure member engageable with the body member to close said compartment opening,
   means for mounting said closure member on said body for swinging opening movement from a first closed position and for limited movement in compartment closing engagement with the body member between said first closed position and an extreme closed position conditioning said mounting means to prevent swinging movement of the closed closure member,
   cooperating means mounted on and slidably engageable between said members remotely of the mounting means to secure the closure member against swinging movement by said limited movement of the closure member to its extreme closed position,
   a resilient rod mounted on one of said members remotely of the mounting means,
   and said members each having opposing shoulders normally interengaged by a portion of said rod to secure the closure member against said limited movement from its extreme closed position,
   and said rod portion being deflectable to disengage at least one of said shoulders to permit said limited movement and actuation of the closure member to said first closed position thereby slidably disengaging said cooperating means and conditioning the mounting means for swinging movement of the closure member.

7. In combination with a vehicle body member having a front compartment opening,
   a front hood member engageable with the body member to close the front compartment opening,
   means rearwardly hinging said hood member on the body member for swinging movement between forward opened and closed positions and for limited rearward movement in compartment closing relation to the body member to a safety position wherein the hood hinging means is conditioned to prevent swinging movement of the closed hood member,
   a support rod having a lateral arm intermediate its ends and mounted on one of said body and hood members for swinging movement between a folded stored position and a raised position wherein the rod is engageable to maintain the hood member to an opened position,
   one of said body and hood members having a slotted opening adapted to receive and engageable with the laterally bent rod arm when the rod is in its folded stored position,
   the other of said body and hood members having a striker shoulder engageable with a portion of the stored rod adjacent the bent arm to latch said hood member in its closed safety position,
   and said bent arm rod portion being accessible for selective striker disengaging manual deflection of the adjacent latching portion of the rod thereby permitting linear actuation of the hood member to its forward closed position wherein the hinging means is conditioned for swinging movement of the hood member.

8. In the combination set forth in claim 7, said hinging means including
   a pair of pivot journals projecting laterally from one of said members adjacent opposite rear side corners of the compartment opening and each of said journals having cylindrical journal surfaces intersected by spaced parallel bearing surfaces,
   and the other of said body members having opposing horizontally disposed slots formed therein adjacent the rear side corners of the compartment opening and slidably mounting the parallel bearing surfaces of said projecting journals for non-swingable rearward movement of the hood member and terminating in cylindrical bearing surfaces rotatably mounting said journals for swinging movement of the hood member to and from its forward closed position.

9. In the combination set forth in claim 7, cooperating means slidably engageable to secure the front of the hood member against swinging movement upon movement of the hood member from its closed forward position rearwardly to its fully closed safety position, said cooperating means including
   at least one headed stud carried by one of said members adjacent the front of the compartment opening and having a shank portion supporting an enlarged head in spaced parallel relation thereto,
   and the other of said body members having at least one forwardly opening slot adjacent the front of the compartment opening for slidably receiving said shank portion and for retaining the head of said stud to preclude front opening of the hood member upon rearward movement from its forward hood journaling position toward its closed safety position.

10. In combination with a vehicle body member having a front compartment opening,
    a closure member engageable with the body member to close said compartment opening,
    means rearwardly hinging said closure member on said body for upward swinging movement between an opened position and a forward closed position and for limited rearward movement in compartment closing engagement with the body member to a closed safety position conditioning said hinging means to prevent swinging movement of the closure member,
    cooperating means adjacent the front of the body and closure members and slidably engageable therebetween to secure the front of the closure member against swinging movement upon rearward movement of the closure member from its forward closed position toward its closed safety position,
    a support rod having a lateral arm intermediate its ends and pivotally mounted on the front of one of said body and closure members for swinging movement between a folded stored position extending transversely of said one member and a raised position wherein the swinging end of the rod is engageable to maintain the closure member to its opened position,
    one of said body and closure members having a slotted opening extending transversely of the vehicle body and adapted to receive and engageable with the lateral rod arm when the rod is in its folded stored position and the other of said body and closure members having an opposing striker shoulder thereon engageable with the rod adjacent said arm to latch said closure member in its closed safety position,
    means for deflecting said rod intermediate its ends in its folded stored position to bias the arm adjacent portion of the rod resiliently into closure latching engagement with said striker shoulder,
    and said rod arm being accessible for manual striker disengaging deflection of said rod to permit actuation of the closure member to its forward closed position thereby slidably disengaging said cooperating means and conditioning the hinging means for swnging movement of the closure member.

11. In the combination set forth in claim 10, said hinging means including
    a pair of cylindrical pivot members projecting laterally from the opposite rear corners of the closure member and oppositely notched to form spaced parallel slidable bearing surfaces interconnected by arcuate journal surfaces,
    and said body member having opposing key-hole shaped slots formed therein adjacent the rear side corners of the compartment opening terminating forwardly in cylindrical journal surfaces and having horizontally disposed elongated rear portions respectively mounting said notched pivot members for upward swinging and nonrotatable sliding movement of the closure member.

12. In the combination set forth in claim 10, said cooperating means including
    a pair of studs having shank portions secured to and extending downwardly from the opposite front undercorners of the closure member and headed in spaced relation thereto,
    and a pair of stud receiving members mounted on said body member adjacent the opposite front corners of the compartment opening each having a forwardly opening slot adapted upon rearward movement of the closure member to its extreme closed safety position to slidably receive and retain the head of the adjacent closure carried stud.

13. In the combination set forth in claim 10, said hinging means including
    a pair of pivot studs secured to and projecting from opposite rear side corners of the closure member and headed to form cylindrical journal surfaces intersected by spaced parallel bearing surfaces,
    said body member having horizontally disposed slots formed adjacent and opening to the opposing rear side corners of the compartment opening and slidably and nonrotatably mounting the parallel bearing surfaces of said pivot studs and terminating forwardly in cylindrical portions journaling said pivot studs for upward swinging movement of the closure member, and said cooperating means including a pair of
parallel transversely spaced headed members depending from and having heads spaced slightly below each front undercorner of the closure member,
and a pair of transversely spaced slotted plates mounted on the body member adjacent each front corner of the compartment opening and each having a slot opening forwardly to receive and retain the adjacent headed members to preclude opening movement of the closure member upon rearward movement from its forward closure journaling position.

14. In combination with a vehicle body member having a front compartment opening and a front hood member engageable with the body member to close said compartment opening,
means for rearwardly hinging the hood member on said body member including
a pair of coaxially aligned pivot journals projecting laterally from one of said members adjacent the opposite rear side corners of the compartment opening and each having cylindrical journal surfaces intersected by spaced parallel slide bearing surfaces,
the other of said members having opposing horizontally disposed slots opening to the adjacent rear side corners of the compartment opening and slidably mounting the parallel bearing surfaces of said pivot journals for non-swinging movement of the hood member in closed relation to the body member through an interlocking range of linear movement,
said slots terminating in cylindrical bearing surfaces rotatably mounting said pivot journals for upward swinging front opening movement of the hood member to and from a forward position in nominal compartment closing engagement with body member,
cooperating means slidably engageable to secure the front of the hood member against swinging movement upon movement of the hood member from its nominally closed forward position rearwardly through its interlocking range of movement to an extreme fully closed safety position,
and means for alternately supporting the hood member in an opened position and for latching said hood member in its extreme fully closed safety position, said alternate hood supporting and latching means including
a support rod having a lateral arm intermediate its ends and pivotally mounted on one of said body and hood members for swinging movement between a folded stored position extending transversely of said one member and a raised position wherein the swinging end of the rod is engageable to maintain the hood member to its opened position, and
one of said body and hood members having a slotted opening extending transversely of the vehicle body and adapted to receive and engageable with said lateral arm when the rod is in its stored position,
and the other of said body and hood members having a striker shoulder opposing said slotted opening and engageable with a portion of the rod adjacent said arm to latch the hood member in its fully closed safety position.

15. In the combination set forth in claim 14,
cooperating means slidably engageable to secure the front of the hood member against swinging movement upon movement of the hood member from its closed forward position rearwardly to its fully closed safety position, said cooperating means including
a pair of transversely spaced studs carried by one of said body and hood members adjacent each front corner of the compartment opening and each having a shank supporting an enlarged head in spaced parallel relation to the stud carrying member,
and the other of said body and hood members having a pair of transversely spaced forwardly opening slots therein adjacent each front corner of the compartment opening and adapted to receive and retain the adjacent headed stud to preclude front opening of the hood member upon rearward movement of the hood member to its extreme fully closed safety position.

16. In the combination set forth in claim 14, said alternate hood supporting and latching means further including
means for deflecting said rod in its stored position to bias said arm adjacent rod portion into resilient hood latching engagement with said striker shoulder,
and said rod arm being accessible for manual deflection disengaging said rod portion from said striker shoulder to permit actuation of said hood member to its forward nominally closed position thereby slidably disengaging said cooperating means and conditioning the hinging means for swinging movement of the hood member.

17. In combination with a vehicle body member having a compartment opening and means hinging a closure member on said body for swinging movement between opened and closed positions and for limited linear movement toward a closed safety position conditioning the hinging means to prevent swinging movement of the closure member,
means for alternately supporting the closure member in an opened position and for latching the closure member in its closed safety position, said supporting and latching means including
a rod having a lateral arm intermediate its ends and pivotally mounted for swinging movement between a stored position relative to one of said members and a raised position wherein the swinging end of the rod is engageable with the other of said members to maintain the closure member in said opened position,
one of said body and closure members having a slot receiving the lateral rod arm when in its stored position,
and the other of said members carrying a striker engageable with the stored rod adjacent its lateral arm thereby latching said closure member in its closed safety position.

18. In the combination set forth in claim 17,
said rod being accessible for striker disengaging deflection thereby releasing the closure member for movement to a closed position conditioning the hinging means for opening swinging movement of the closure member.

19. In combination with a vehicle body member having a compartment opening and means hinging a closure member on said body for swinging movement between opened and closed positions and for limited linear movement in compartment closing engagement with the body member to a safety position wherein the hinging means is interlocked to prevent swinging movement of the closure member,
a closure supporting rod having one end pivotally mounted on one of said body and closure members for swinging movement between a folded stored position extending transversely of the vehicle body and a raised position wherein the swinging end of the rod is engageable with the other of said members to maintain the closure member in an opened position,
said rod having a laterally extending arm formed intermediate its ends and adjacent to its swinging end,
one of said body and closure members having a slotted opening extending transversely of the vehicle body and adapted to receive the lateral rod arm when the rod is in its folded stored position,
the other of said body and closure members having a shoulder thereon opposite said slotted opening and engageable with the swinging end of the rod to latch the closure member in its closed safety position,
means for deflecting the rod intermediate its ends when in its stored position to bias the swinging end thereof resiliently into closure latching engagement with said shoulder, and said swinging rod end being accessible in its stored position for manual deflection and disengagement from said latching shoulder to permit linear actuation of the closure member to a position conditioning the hinging means for swinging movement of the closure member.

References Cited by the Examiner

UNITED STATES PATENTS

| | | | |
|---|---|---|---|
| 293,288 | 2/1884 | Von Darteln | 217—59 |
| 641,745 | 1/1900 | Winter | 292—262 |
| 2,140,849 | 12/1938 | Opland | 292—262 |
| 2,374,426 | 4/1945 | Diederich | 292—262 |
| 2,548,492 | 4/1951 | Rivard et al. | 180—69 |

FOREIGN PATENTS

| | | |
|---|---|---|
| 556,833 | 10/1943 | Great Britain. |
| 1,065,436 | 1/1954 | France. |

BENJAMIN HERSH, *Primary Examiner.*

A. HARRY LEVY, *Examiner.*